United States Patent [19]
Ueda et al.

[11] Patent Number: 5,697,992
[45] Date of Patent: Dec. 16, 1997

[54] ABRASIVE PARTICLE, METHOD FOR PRODUCING THE SAME, AND METHOD OF USE OF THE SAME

[75] Inventors: Kazumasa Ueda; Yoshiaki Takeuchi, both of Niihama, Japan

[73] Assignee: Sumitomo Chemical Company, Limited, Osaka, Japan

[21] Appl. No.: 651,500

[22] Filed: May 22, 1996

[30]  Foreign Application Priority Data

May 22, 1995 [JP] Japan ................................ 7-122314
Feb. 29, 1996 [JP] Japan ................................ 8-043724

[51] Int. Cl.$^6$ ........................................... C09C 1/68
[52] U.S. Cl. .................................... 51/307; 51/309
[58] Field of Search ................................ 51/307, 309

[56]  References Cited

U.S. PATENT DOCUMENTS

| | | | |
|---|---|---|---|
| 4,331,565 | 5/1982 | Schaefer et al. | 252/462 |
| 5,114,437 | 5/1992 | Takeuchi et al. | 51/293 |
| 5,264,010 | 11/1993 | Brancaleoni et al. | 51/309 |
| 5,429,647 | 7/1995 | Larmie | 51/309 |
| 5,445,996 | 8/1995 | Kodera et al. | 437/225 |

FOREIGN PATENT DOCUMENTS

| | | |
|---|---|---|
| 1519396 | 5/1969 | Germany . |
| 2737358 | 3/1978 | Germany . |
| 56-026547A | 3/1981 | Japan . |
| 62-083315A | 4/1987 | Japan . |
| 5009463 | 1/1993 | Japan . |
| 05220394A | 8/1993 | Japan . |
| 9322103 | 11/1993 | WIPO . |
| 9407970 | 4/1994 | WIPO . |

OTHER PUBLICATIONS

"Effect of Sintering Atmosphere on the Pore–Structure Stability of Cerium–Doped Nanostructured Alumina" by K.N.P. Kumar et al, Materials Research Bulletin, vol. 29, No. 5, pp. 551–558 1994.

"Effect of Cerium Addition on the Thermal Stability of Gamma Alumina Support" by M. Ozawa et al., J. Materials Science Letters 9 (1990) pp. 291–293.

"Thermal Stability and Characterization of $\gamma$–$Al_2O_3$ Modified with Lanthanum org Cerium" by M. Ozawa et al Journal of Materials Science Letters ( (1990) pp. 709–711.

"Thermal Stability of Ce Added $\gamma$–$Al_2O_3$", by A. Ozawa et al., Powder and Powder Metallurgy, vol. 37 No. 3, pp. 466–473 (1990).

*Primary Examiner*—Deborah Jones
*Attorney, Agent, or Firm*—Birch, Stewart, Kolasch & Birch, LLP

[57]  ABSTRACT

Disclosed is an abrasive particle having an average particle size of not more than 2 μm and comprising 100 parts by weight of aluminum oxide and/or silicon oxide and 5 to 25 parts by weight of cerium in the form of cerium oxide. A method for producing the same, and a method for planarizing an insulating film on a semiconductor substrate using the abrasive particles are also disclosed.

17 Claims, No Drawings

ABRASIVE PARTICLE, METHOD FOR PRODUCING THE SAME, AND METHOD OF USE OF THE SAME

FIELD OF THE INVENTION

The present invention relates to an abrasive particle, a method for producing the same, and a method for planarizing an insulating film formed on a semiconductor substrate, which comprises planarizing the insulating film formed on the semiconductor substrate, using the abrasive particles.

BACKGROUND OF THE INVENTION

With the rapid progress of the LSI technology, an integrated circuit has been liable to become fine and form multilayer interconnection more and more. The multilayer interconnection in an integrated circuit drastically increases any problems associated with any irregularities in the semiconductor surface, and the presence of any difference in levels due to an irregularity causes breaks in the printing at the uneven levels and local increases in resistance. The presence of level differences in fine integrated circuits tends to cause wires to break, decreases in current capacity, and decreases in electromigration, etc., which results in yield decreases and inferior reliability.

Therefore, it has been desired to develop a technique for planarizing interlayer dielectrics of $SiO_2$, which insulates between an element or printing of the lower layer and a wiring of the upper layer in a multilayer interconnection substrate, in order to eliminate any irregularity between the respective layers.

Various conventional planarizing techniques have been suggested. When a method of reflow or etch back of SOG (spin-on-glass; application glass method) is applied to a device having a wiring width of not more than 0.35 μm, it is difficult to planarize the whole device. Therefore, a CMP (Chemical Mechanical Polishing) method which makes it possible to planarize the whole device has been drawing special interest.

In the planarizing step of the insulating film of the semiconductor according to this CMP method, a slurry prepared by dispersing colloidal silica or fumed silica in an aqueous alkaline solution of KOH, NaOH, etc. has hitherto been used as the polishing agent. When silica is used as the polishing agent for the $SiO_2$ insulating film, defects do not arise. However, a sufficient polishing rate cannot be obtained by merely dispersing the colloidal silica or fumed silica in water because the polishing agent and the insulating film to be polished are the same material. Accordingly, the polishing rate has been improved by combining the above aqueous alkaline solution with the polishing agent. However, another problem arises such that, when the insulating film is polished using a polishing agent slurry containing the alkaline metal, the alkaline metal in the slurry diffuses into the insulating film to drastically deteriorate the reliability of the semiconductor device.

As a method for solving the above problem, a method of using a polishing agent containing cerium oxide has been disclosed (Japanese Patent Kokai (Laid-Open) No. 5-326469). It is described that, when the insulating film on the semiconductor substrate is polished by this method, it can be polished at high speed without using an alkaline metal solution.

However, the cerium oxide is normally produced from a ore such as a bastnaesite ore via pulverization, classification, calcination, etc. and, therefore, the particle size is uneven in comparison with an artificial oxide and the reproductivity and stability of the polishing ability are inferior. Further, the bastnaesite ore has low purity and normally contains α ray radioactive elements as impurities because it is natural ore. Therefore, when the polishing agent adheres and remains on the device, soft errors due to α ray radiation are liable to arise. High-purity cerium oxide without such impurities is very expensive and it is difficult to industrially apply high-purity cerium oxide as the polishing agent because of the cost.

As another polishing agent for a metal or glass surface, aluminum oxide has hitherto been known. Aluminum oxide has a high hardness and is cheaper than high-purity cerium oxide and, therefore, it is a substance which has widely been used as a polishing agent. Regarding polishing of the semiconductor insulating film using it, however, the polishing rate is low and defects such as scratches, orange peels, etc. are formed on the polished surface. Therefore, it cannot be put to practical use.

The present inventors have studied the above issues in order to discover a polishing agent which is suitable for planarizing an insulating film on a semiconductor substrate, which is inexpensive, which provides for a high polishing rate without using a solution of an alkaline metal, which causes few defects (e.g., scratches, orange peels, etc.), and which avoids α ray radiation that can cause soft errors. As a result, it has been found that an abrasive particle comprising aluminum oxide and/or silicon oxide and specific amount of cerium oxide and having a specific particle size range satisfies all of the above objects when such an abrasive particle is employed as a polishing agent for an insulating film on a semiconductor substrate. Thus, the present invention has been accomplished.

SUMMARY OF THE INVENTION

The present invention provides an abrasive particle which has an average particle size of 2 μm or less, and which comprises (a) 100 parts by weight of a metal oxide selected from aluminum oxide and silicon oxide and (b) 5 to 25 parts by weight of cerium in the form of cerium oxide.

The present invention also provides a method for producing the abrasive particles, which comprises a step of suspending in a solvent a compound selected from the metal oxide having an average particle size of 2 μm or less in an amount of 100 parts by weight and a precursor thereof which is converted by calcining to the metal oxide having an average particle size of 2 μm or less in an amount of 100 parts by weight to form a suspension; a step of mixing into the suspension a cerium compound which is converted by calcining to cerium oxide in an amount of 5 to 25 parts by weight in terms of cerium to form a mixture; a step of drying the mixture; and a step of calcining the dried mixture.

The present invention further provides a method for planarizing an insulating film on a semiconductor substrate, which comprises polishing the insulating film formed on the semiconductor substrate using a polishing agent which comprises the abrasive particles.

DETAILED DESCRIPTION OF THE INVENTION

The abrasive particle of the present invention comprises metal oxide selected from aluminum oxide and silicon oxide and cerium oxide, and is used as a polishing agent for, for example, an insulating film formed on a semiconductor substrate. The abrasive particle has an average particle size (average secondary particle size) measured by a light scattering method (microtrack) of not more than about 2 μm, preferably about 0.2 to 1.0 μm. The content of the cerium oxide in terms of Ce is about 5 to 25 parts by weight, preferably about 8 to 20 parts by weight per 100 parts by weight of the metal oxide.

When the average particle size of the abrasive particle exceeds 2 μm and such particles are used as the polishing agent, defects such as scratches and orange peels are formed on the polished surface.

When the amount of cerium oxide in terms of Ce is less than about 5 parts by weight per 100 parts of the metal oxide and such particles are used as the polishing agent, the desired effect of improving the polishing rate can not be obtained, the planarizing effect of the surface of the insulating film is inferior, and defects such as scratches and orange peels are formed in the polished surface.

On the other hand, even if the amount of the cerium oxide in terms of Ce is larger than 25 parts by weight and such particles are used for the polishing agent, the desired effect of improving the polishing rate can not be obtained and production cost becomes high.

The cerium oxide may be present in the abrasive particle, or it may be adhered to or coated on the surface of the abrasive particle. If the particles are a mere mixture obtained by mixing particles of metal oxide (aluminum oxide and/or silicon oxide) and particles of cerium oxide and used as a polishing agent, the polishing rate cannot be improved without causing scratches, orange peels, etc. on the polished surface.

The abrasive particle of the present invention generally has a BET specific surface area of about 40 to 150 $m^2/g$ in view of polishing ability and the effect of improving the polishing rate when used as a polishing agent, preferably 40 to 100 $m^2/g$, and more preferably 40 to 70 $m^2/g$.

The content of Na and K as impurities in the abrasive particle is usually 50 ppm or less and preferably 20 ppm or less. When the content is 20 ppm or less, it is possible to obtain an insulating film having higher reliability after a polishing treatment using a polishing agent comprising the particles.

When the metal oxide in the abrasive particle is aluminum oxide, it is recommended that the aluminum oxide is transition alumina, usually transition alumina mainly containing γ-alumina, for preventing scratches, orange peels, etc..

The abrasive particles of the present invention can be produced by a method which comprises a step of suspending in a solvent the metal oxide (aluminum oxide and/or silicon oxide) having an average particle size of about 2 μm or less or a precursor of the metal oxide, a step of mixing into the suspension a cerium compound, a step of drying the mixture and a step of calcining the dried mixture.

The precursor of the metal oxide is a compound which is converted by calcining to the aluminum oxide and/or silicon oxide having an average particle size of about 2 μm or less.

Examples of the above-mentioned metal oxide precursor include metal hydroxides, metal nitrates, metal acetates, metal sulfates, metal oxalates, metal carbonates, ammonium metal nitrates and ammonium metal sulfates, wherein the metal is aluminum or silicon. Among these, metal hydroxides are suitably used. As the method for producing the metal oxide having an average particle size of 2 μm or less or precursor of the metal oxide, known methods can be used. Examples thereof include an alkoxide method which includes hydrolyzing an organic aluminum compound or organic silicon compound such as alkylaluminum, alkylsilicon, aluminum alkoxide (e.g., aluminum isopropoxide, aluminum ethoxide, aluminum n-propoxide and aluminum n-butoxide) and silicon alkoxide (e.g., silicon ethoxide) in an alcohol; a vapor phase method which includes vaporizing a metal compound such as aluminum halide and silicon halide (e.g., aluminum chloride, aluminum bromide, aluminum iodide, silicon chloride, silicon bromide and silicon iodide), followed by burning and hydrolyzing in oxygen-hydrogen flame, etc.. The aluminum oxide or silicon oxide powder obtained by these methods is an agglomerated powder having primary particles with an average particle size of about 0.5 or less, normally 0.01 to 0.2 μm, and may be pulverized to about the same particle size of the primary particles during the polishing under a moderate pressure. In addition, the aluminum oxide obtained by these methods has lower Na and K content (50 ppm or less, normally 20 ppm or less) than the aluminum hydroxide or aluminum oxide obtained by the conventional Bayer method.

The cerium compound may be any cerium compound as long as it is dissolved or uniformly dispersed in a solvent to be used in the suspension of the metal oxide or precursor of the metal oxide, and as long as it is converted to cerium oxide by calcining. Examples thereof include cerium nitrates, cerium acetates, cerium sulfates, cerium chlorides, cerium oxalates, cerium carbonates, ammonium cerium sulfate, ammonium cerium nitrate, and the like. Cerium nitrates, cerium acetates, cerium sulfates and cerium chlorides are preferred.

As a matter of course, it is preferred to use a cerium compound as a raw material which substantially does not incorporate Na and K as impurities after calcining, such as a raw material wherein the total content of Na and K contained in the abrasive particle is not more than 50 ppm.

The amount of the cerium compound is such an amount that the amount of the cerium oxide obtained by calcining is about 5 to 25 parts by weight, preferably about 8 to 20 parts by weight in terms of cerium, per 100 parts by weight of the metal oxide.

Examples of the solvent used for the suspension are water, and alcohols such as methyl alcohol, ethyl alcohol and isopropyl alcohol.

After mixing the cerium compound into the suspension, the mixture is dried by removing the solvent, and then calcining the dried mixture at a temperature from about 600° to 1100° C. for at least one minute, for normally about 10 minutes to about 5 hours.

The type of drier used is not specifically limited as long as dried mixture obtained becomes fine particles which tend not to agglomerate. It is preferred to use a flash drier or a pneumatic conveying drier for drying the mixture.

When the calcining temperature is lower than about 600° C., the cerium compound as a source of cerium cannot be converted to cerium oxide. On the other hand, when it exceeds about 1100° C., the particle size becomes too large, which can cause defects if used in the polishing agent.

When the metal oxide is aluminum oxide, the dried mixture is calcined so that the crystal form of the aluminum oxide after calcining is transition alumina such as γ-alumina. The calcining condition may be selected within the range of the above calcining temperature and time.

As the calcining device, there can be used known calcining furnaces such as a rotary kiln, a flash calcining furnace, a packing-type calcining furnace, a fluidized calcining furnace, a tunnel furnace, a vacuum furnace shuttle furnace, and the like. The calcining device is not specifically limited, but the rotary kiln, tunnel furnace and shuttle furnace are normally suitable in view of productivity, heat resistance of materials, etc.

The surface appearance of the abrasive particle obtained by the above method was observed by a transmission electron microscope. As a result, the abrasive particle shows either a condition where the metal oxide surface is coated with the cerium oxide, a condition where a part of the metal oxide surface is coated with the cerium oxide or a condition where cerium oxide is included in the particle. The particles are not a mere mixture of the metal oxide powder and cerium oxide powder.

The abrasive particles thus obtained are normally used as a polishing agent, especially a wet polishing agent for planarizing the semiconductor insulating film in a form of a slurry dispersed into water.

Examples of the dispersing methods for converting the particles into a slurry include dispersing methods using a homogenizer, ultrasonic wave, wet medium mill, etc.

The slurry concentration is not specifically limited, and is normally about 2 to 30% by weight.

If necessary, known additives such as a dispersant, a suspension stabilizer and a defoamer can also be added to the polishing agent.

Examples of the semiconductor insulating film which is to be polished are known insulating films such as a thermally oxidized film, CVD film, spatter film, SOG film and fluorine-containing insulating film.

The abrasive particle of the present invention comprising inexpensive metal oxide, a specific amount of cerium oxide and having a specific particle size range exhibits high polishing performance without requiring an alkaline metal (e.g. NaOH, KOH, etc.) and causes few defects (e.g. scratches, orange peels, etc.) and emit little $\alpha$ ray radiation which can cause soft errors. Therefore, its utility value as a polishing agent for glass of photomask, glass substrate for liquid crystal or hard disc, etc. as well as polishing agent for polishing the insulating film on the semiconductor substrate is extremely significant. The abrasive particles can be obtained by a simple method.

The following Examples and Comparative Examples further illustrate the present invention in detail but are not to be construed to limit the scope thereof.

The measurement in the Examples and Comparative Examples was conducted by the following method.

Average particle size (secondary): A particle size at 50% cumulation was measured by a Microtrack MKII particle size analyzer (SPA model 7997-20, manufactured by Nikkiso Co., Ltd.).

Radiation dose of $\alpha$ ray: It was measured by an $\alpha$ ray measuring device (Model ZDS-451, manufactured by Alloca Co.) when the radiation dose of $\alpha$ ray is 0.1 c/cm$^2$·hr or more. It was measured by a low-level $\alpha$ ray measuring device (Model LACS-4000M, manufactured by Sumitomo Chemical Industries Co., Ltd.) when the radiation dose of $\alpha$ ray is less than 0.1 c/cm$^2$·hr.

BET specific surface area: It was measured by a flow type specific area automatic measuring device (Model Flow Sorb II 2300PC-1A, manufactured by Shimadzu Corporation).

Content of Na and K: It was measured by Spark Source Mass Spectrometer (JEOL JMS-01BM-2).

EXAMPLE 1

To a slurry prepared by suspending 250 g of aluminum hydroxide having an average particle size of 0.6 μm produced by hydrolysis of aluminum alkoxide in 940 ml of isopropyl alcohol (hereinafter referred to as IPA), a solution prepared by dissolving 52.69 g (amount corresponding to 10% by weight in terms of Ce based on aluminum oxide) of cerium nitrate [Ce(NO$_3$)$_3$·6H$_2$O] in 170 g of IPA was added dropwise, followed by mixing with stirring. The mixed solution was heated at with refluxing for 2 hours and then dried by removing the solvent.

The dried mixture was calcined at 1050° C. for 3 hours. The resulting particles were examined by X-ray diffraction. As a result, the crystal form of aluminum oxide in the particles was γ-alumina. The average particle size, BET specific surface area and total content of Na and K were 0.8 μm, 56 m$^2$/g and 13 ppm, respectively. It has been confirmed by the results of the elemental analysis by transmission electron microscope (TEM-EDX) that cerium is contained in the respective primary particles of alumina.

The particles (30 g) thus obtained was dispersed in water (270 g) to form a slurry having a concentration of 10% by weight. Ammonium polycarboxylate (manufactured by San Nopco Limited) as the dispersant was added to this slurry in an amount of 0.5% by weight based on the particles to form a polishing agent slurry (pH: 9.3), and then a silicon oxide film having a film thickness of 1 μm was polished. The polishing conditions are as follows: processing pressure: 110 g/cm$^2$, platen speed: 140 rpm and polishing pad: Rodel SUBA800 (trade name, manufactured by Rodel Co.). The polishing rate, state of surface defects and radiation dose of $\alpha$ ray were examined. The results are shown in Table 1.

EXAMPLE 2

According to the same manner as that described in Example 1 except for using an aqueous KOH solution as the dispersant of a polishing agent slurry in place of ammonium polycarboxylate and adjusting the pH to 10, a polishing agent slurry was obtained. A silicon oxide film was polished under the same condition as that of Example 1, using the resulting polishing agent slurry. The results are shown in Table 1.

EXAMPLE 3

According to the same manner as that described in Example 1 except for changing the amount of cerium nitrate to 105.38 g (amount corresponding to 20% by weight in terms of Ce based on aluminum oxide), abrasive particles were obtained. The crystal form of the aluminum oxide in the abrasive particles was γ-alumina. The average particle size, BET specific surface area and total content of Na and K were 0.8 μm, 51 m$^2$/g and 4 ppm, respectively.

According to the same manner as that described in Example 2, a polishing agent slurry was obtained from the resulting abrasive particles. A silicon oxide film was polished under the same condition as that of Example 1, using the resulting polishing agent slurry. The results are shown in Table 1.

EXAMPLE 4

According to the same manner as that described in Example 1 except for using 170 g of silicon oxide having an average particle size of 0.4 μm in place of aluminum hydroxide having an average particle size of 0.6 μm, abrasive particles were obtained. The average particle size, BET specific surface area and total content of Na and K of the particles were 0.6 μm, 60 m$^2$/g and 19 ppm, respectively.

According to the same manner as that described in Example 2, a polishing agent slurry was obtained from the resulting abrasive particles. A silicon oxide film was polished under the same condition as that of Example 1, using the resulting polishing agent slurry. The results are shown in Table 1.

EXAMPLE 5

According to the same manner as that described in Example 3 except for using water in place of IPA, abrasive particles were obtained. The crystal form of the aluminum oxide in the abrasive particles was γ-alumina. The average particle size, BET specific surface area and total content of Na and K were 1.1 μm, 57 m$^2$/g and 4 ppm, respectively.

According to the same manner as that described in Example 1, a polishing agent slurry was obtained from the resulting abrasive particles. A silicon oxide film was polished under the same condition as that of Example 1, using the resulting polishing agent slurry. The results are shown in Table 1.

COMPARATIVE EXAMPLE 1

According to the same manner as that described in Example 1 except for adding no cerium nitrate, abrasive particles were obtained. The crystal form of the aluminum oxide in the abrasive particles was γ-alumina. The average particle size and BET specific surface area were 0.8 μm and 83 m$^2$/g, respectively.

According to the same manner as that described in Example 2, a polishing agent slurry was obtained from the resulting abrasive particles. A silicon oxide film was polished under the same condition as that of Example 1, using the resulting polishing agent slurry. The results are shown in Table 1.

COMPARATIVE EXAMPLE 2

According to the same manner as that described in Example 1 except for changing the amount of cerium nitrate to 15.81 g (amount corresponding to 3% by weight in terms of Ce based on aluminum oxide), abrasive particles were obtained. The crystal form of the aluminum oxide in the abrasive particles was γ-alumina. The average particle size and BET specific surface area were 0.9 μm and 55 m$^2$/g, respectively.

According to the same manner as that described in Example 2, a polishing agent slurry was obtained from the resulting abrasive particles. A silicon oxide film was polished under the same condition as that of Example 1, using the resulting polishing agent slurry. The results are shown in Table 1.

COMPARATIVE EXAMPLE 3

According to the same manner as that described in Example 1 except for using aluminum hydroxide having an average particle size of 2.1 μm obtained by the same method of Example 1 in place of aluminum hydroxide having an average particle size of 0.6 μm, abrasive particles were obtained. The crystal form of the aluminum oxide in the abrasive particles was γ-alumina. The average particle size and BET specific surface area were 2.5 μm and 82 m$^2$/g, respectively.

According to the same manner as that described in Example 2, a polishing agent slurry was obtained from the resulting abrasive particles. A silicon oxide film was polished under the same condition as that of Example 1, using the resulting polishing agent slurry. The results are shown in Table 1.

COMPARATIVE EXAMPLE 4

According to the same condition as that described in Example 1 except for using a fumed silica slurry SC-1 (trade name, manufactured by Cabot Co., U.S.A., average particle size: 4 μm, pH 10, containing KOH) in place of the polishing agent slurry obtained in Example 1, a silicon oxide film was polished. The results are shown in Table 1.

COMPARATIVE EXAMPLE 5

According to the same manner as that described in Example 2 except for using cerium oxide (Trade Name:REMILLOX, manufactured by Fujimi Kenmazai Kogyo Incorporated, purity of the Cerium oxide: 55%, average particle size: 2.5 μm) in place of the abrasive particles obtained in Example 2, a polishing agent slurry was obtained. A silicon oxide film was polished under the same condition as that of Example 1, using the slurry. The results are shown in Table 1.

COMPARATIVE EXAMPLE 6

According to the same manner as that described in Example 2 except for using a mixture of cerium oxide used in Comparative Example 5 and aluminum oxide used in Comparative Example 1 (mixing ratio: 90% by weight: 10% by weight) in place of the abrasive particles obtained in Example 2, a polishing agent slurry was obtained. A silicon oxide film was polished under the same condition as that of Example 1, using this slurry. The results are shown in Table 1.

TABLE 1

|  | Polishing rate[1] (mg/minute) | Surface appearance | Dose of α ray c/cm$^2$ · hr |
|---|---|---|---|
| Example 1 | 1.01 | No defect | 0.007 |
| Example 2 | 1.19 | No defect | — |
| Example 3 | 1.33 | No defect | — |
| Example 4 | 0.91 | No defect | — |
| Example 5 | 1.30 | No defect | — |
| Comparative Example 1 | 0.23 | Some scratches are observed. | — |
| Comparative Example 2 | 0.50 | Some scratches are observed. | — |
| Comparative Example 3 | 0.11 | Some scratches are observed. | — |
| Comparative Example 4 | 0.38 | No defect | — |
| Comparative Example 5 | 1.78 | No defect | 250 |
| Comparative Example 6 | 1.12 | Some scratches are observed. | — |

The symbol "—" in the column of the α ray dose means "not measured".
[1]: The polishing rate was calculated based on weight loss of the film polished.

EXAMPLE 6

Using abrasive particles obtained in the same manner as in Example 3, a polishing agent slurry was obtained according to the same manner as in Example 1. A silicon oxide film having a film thickness of 1 μm was polished using the polishing agent slurry. The polishing conditions are as follows:
processing pressure 480 g/cm$^2$,
platen speed 50 rpm and
polishing pad Rodel IC-1000/SUBA400 (A21) (trade name, manufactured by Rodel Co.).
The results are shown in Table 2.

COMPARATIVE EXAMPLE 7

A silicon oxide film was polished under the same condition as that of Example 6, using the same slurry as that of Comparative Example 4. The results are shown in Table 2.

TABLE 2

| | Polishing rate[2] (Å/minute) | Surface appearance |
|---|---|---|
| Example 6 | 3540 | No defect |
| Comparative Example 7 | 1160 | No defect |

[2]: The polishing rate was calculated based on decrease in thickness of the film polished.

What is claimed is:

1. An abrasive particle which has an average particle size of 2 μm or less, and which comprises (a) 100 parts by weight of at least one metal oxide selected from the group consisting of aluminum oxide and silicon oxide and (b) 5 to 25 parts by weight of cerium as cerium oxide.

2. The abrasive particle according to claim 1, wherein said particle has a BET specific surface area of from 40 to 150 m$^2$/g.

3. The abrasive particle according to claim 1, wherein the metal oxide is aluminum oxide and the aluminum oxide is transition alumina.

4. The abrasive particle according to claim 1, wherein said abrasive particle has an impurity content of Na and K of 50 ppm or less.

5. The abrasive particle according to claim 1, wherein the particle is obtained by a method comprising a step of suspending in a solvent a compound selected from the metal oxide having an average particle size of 2 μm or less and a precursor thereof which is converted by calcining to the metal oxide having an average particle size of 2 μm or less to form a suspension; a step of mixing into the suspension a cerium compound which is converted by calcining to cerium oxide to form a mixture; a step of drying the mixture; and a step of calcining the dried mixture.

6. A method for producing abrasive particles, which comprises a step of suspending in a solvent at least one compound selected from the group consisting of aluminum oxide having an average particle size of 2 μm or less in an amount of 100 parts by weight, silicon oxide having an average particle size of 2 μm or less in an amount of 100 parts by weight and precursor aluminum or silicon oxide which is converted by calcining to aluminum oxide or silicon oxide having an average particle size of 2 μm or less in an amount of 100 parts by weight to form a suspension; a step of mixing into the suspension a cerium compound in an amount of 5 to 25 parts by weight in terms of cerium, wherein the cerium compound is converted to cerium oxide by calcining to form a mixture; a step of drying the mixture; and a step of calcining the dried mixture to obtain the abrasive particles having an average particle size of 2 μm or less, each of which comprises (a) 100 parts by weight of at least one metal oxide selected from the group consisting of aluminum oxide and silicon oxide and (b) 5 to 25 parts by weight of cerium as cerium oxide.

7. The method according to claim 6, wherein the cerium compound is at least one member selected from the group consisting of cerium nitrate, cerium acetate, cerium sulfate, cerium chloride, cerium oxalate, cerium carbonate, ammonium cerium sulfate and ammonium cerium nitrate.

8. The method according to claim 6, wherein aluminum oxide is obtained by hydrolysis of an organic aluminum compound.

9. The method according to claim 8, wherein the organic aluminum compound is an aluminum alkoxide.

10. The method according to claim 6, wherein the precursor of aluminum oxide is aluminum hydroxide obtained by hydrolysis of an organic aluminum compound.

11. The method according to claim 10, wherein the organic aluminum compound is an aluminum alkoxide.

12. The method according to claim 6, wherein the step of drying is carried out by a method using a flash drier or a pneumatic conveying drier.

13. A method for planarizing an insulating film on a semiconductor substrate, which comprises polishing the insulating film formed on the semiconductor substrate using a polishing agent which comprises abrasive particles having an average particle size of 2 μm or less, and each of the abrasive particles comprising (a) 100 parts by weight of at least a metal oxide selected from the group consisting of aluminum oxide and silicon oxide and (b) 5 to 25 parts by weight of cerium in the form of cerium oxide.

14. The abrasive particle according to claim 1, wherein said average particle size is about 0.2 μm to 1.0 μm.

15. The abrasive particle according to claim 2, wherein the BET specific surface area is from 40 to 100 m$^2$/g.

16. The abrasive particle according to claim 2, wherein the BET specific surface area is from 40 to 70 m$^2$/g.

17. A method for producing abrasive particles, which comprises a step of suspending in a solvent at least one compound selected from the group consisting of aluminum oxide having an average particle size of 2 μm or less in an amount of 100 parts by weight, silicon oxide having an average particle size of 2 μm or less in an amount of 100 parts by weight and precursor aluminum or silicon oxide which is converted by calcining at a temperature of from 600° C. to 1100° C. to aluminum oxide or silicon oxide having an average particle size of 2 μm or less in an amount of 100 parts by weight to form a suspension; a step of mixing into the suspension a cerium compound in an amount of 5 to 25 parts by weight in terms of cerium, wherein the cerium compound is converted to cerium oxide by calcining to form a mixture; a step of drying the mixture; and a step of calcining the dried mixture to obtain the abrasive particles having an average particle size of 2 μm or less, each of which comprises (a) 100 parts by weight of at least one metal oxide selected from the group consisting of aluminum oxide and silicon oxide and (b) 5 to 25 parts by weight of cerium as cerium oxide, wherein said aluminum oxide is a transition alumina mainly containing γ-alumina.

* * * * *